(12) United States Patent
Gronemeyer et al.

(10) Patent No.: US 8,144,810 B2
(45) Date of Patent: Mar. 27, 2012

(54) SERIAL RADIO FREQUENCY TO BASEBAND INTERFACE WITH PROGRAMMABLE CLOCK

(75) Inventors: Steve Gronemeyer, Cedar Rapids, IA (US); Robert Tso, South San Gabriel, CA (US)

(73) Assignee: CSR Technology Inc., San Jose, CA (US)

( * ) Notice: Subject to any disclaimer, the term of this patent is extended or adjusted under 35 U.S.C. 154(b) by 1008 days.

(21) Appl. No.: 10/369,853

(22) Filed: Feb. 19, 2003

(65) Prior Publication Data

US 2004/0162102 A1    Aug. 19, 2004

(51) Int. Cl.
*H03K 9/00* (2006.01)
(52) U.S. Cl. .............. 375/316; 340/426.19; 340/539.13; 342/357.22; 342/357.24
(58) Field of Classification Search ................... 375/220, 375/257, 316; 455/550
See application file for complete search history.

(56) References Cited

U.S. PATENT DOCUMENTS

| | | | | |
|---|---|---|---|---|
| 5,157,690 A * | 10/1992 | Buttle | ............................ | 375/232 |
| 5,877,724 A * | 3/1999 | Davis | ........................ | 342/357.1 |
| 2002/0132648 A1* | 9/2002 | Kerth et al. | ................... | 455/570 |
| 2002/0141511 A1 | 10/2002 | Vishakhadatta et al. | | |
| 2002/0142741 A1 | 10/2002 | Molnar et al. | | |
| 2002/0168942 A1 | 11/2002 | Vishakhadatta et al. | | |
| 2002/0168951 A1 | 11/2002 | Paulus et al. | | |
| 2002/0168952 A1 | 11/2002 | Vishakhadatta et al. | | |
| 2002/0172263 A1 | 11/2002 | Kindred et al. | | |
| 2002/0187763 A1 | 12/2002 | Lim et al. | | |
| 2002/0193084 A1 | 12/2002 | Lim et al. | | |
| 2002/0193140 A1 | 12/2002 | Behrens et al. | | |
| 2003/0003887 A1 | 1/2003 | Lim et al. | | |
| 2003/0013428 A1 | 1/2003 | Marques et al. | | |
| 2003/0017809 A1 | 1/2003 | Garlepp et al. | | |
| 2003/0063690 A1 | 4/2003 | Paulus et al. | | |
| 2003/0165186 A1* | 9/2003 | Kohli et al. | ................... | 375/150 |
| 2003/0232613 A1 | 12/2003 | Kerth et al. | | |
| 2004/0077327 A1 | 4/2004 | Lim et al. | | |
| 2006/0262882 A1* | 11/2006 | Gronemeyer et al. | ........ | 375/316 |

OTHER PUBLICATIONS

A Low Cost GPS Receiver for In-Vehicle Navigation, Steven Moore, 10 pages.
SiGe Semiconductor SE4100L data sheet, 16 pages, dated Aug. 6, 2002.
SiRFStar® GPS Architecture GRF1/LXi data sheet, 16 pages, dated Feb. 2001.
SiRFStar® GPS Architecture GSP1/LX data sheet, 52 pages, dated Mar. 31, 2000.
SiRFStar® IIe Chip Set Architecture Sheet, 2 pages, dated Jan. 2002.
SiRFStar® IIe/LP Chip Set Architecture Sheet, 2 pages, dated Feb. 2002.
SiRFStar® IIt Chip Set Architecture Sheet, 2 pages, dated Jan. 2002.

(Continued)

*Primary Examiner* — David C. Payne
*Assistant Examiner* — Adolf Dsouza
(74) *Attorney, Agent, or Firm* — Minh N. Nguyen, Esq.; Next IP Law Group LLP

(57) ABSTRACT

An interface between an RF processing section and a baseband processing section supports general purpose message transmission as well as satellite positioning system signal sample transmission between the RF processing section and the baseband processing section. The interface includes a bi-directional message serial interface and a data serial interface. The complexity of the data serial interface may be minimized by using a single data bit signal line in the data serial interface.

37 Claims, 5 Drawing Sheets

OTHER PUBLICATIONS

New Fast GPS Code-Acquisition using FFT, Eletronic Letters, vol. 27. No. 2, pp. 158-160 (1991).

Novel Fast GPS/GLONASS Code Acquisition Technique USing Low Update Rate FFT, Electronic Letters, Vo. 28, No. 9, pp. 863-865 (1992).

* cited by examiner

SERIAL RADIO FREQUENCY TO BASEBAND INTERFACE WITH PROGRAMMABLE CLOCK

BACKGROUND OF THE INVENTION

1. Field of the Invention

This invention relates to an interface for coupling a radio frequency (RF) processing section to a baseband processing section. More specifically, this invention relates to a serial message and data interface between an RF processing section and a baseband processing section.

2. Related Art

The worldwide use of wireless devices such as two-way radios, pagers, portable televisions, personal communication systems ("PCS"), personal digital assistants ("PDAs"), cellular telephones (also known as "mobile phones"), Bluetooth devices, satellite radio receivers and Satellite Positioning Systems ("SPS") such as the Global Positioning System ("GPS"), also known as NAVSTAR, is growing at a rapid pace. Current trends are calling for the incorporation of SPS services into a broad range of electronic devices and systems, including PDAs, cellular telephones, portable computers, automobiles, and the like.

At the same time, manufacturers design their devices using very different architectures, spanning a wide variety of processors, frequency references, clock rates, and the like. The manufacturers are also very interested in keeping costs as low as possible while providing as much functionality (including SPS capability) as possible. In particular, architectures which split SPS signal processing between a radio frequency (RF) front end a baseband processing section continue to be popular.

For example, SiRF Technology, Inc. of San Jose, Calif. made popular an SPS chipset that included the GRF1 RF chip and GSP1/LX baseband processing chip. These two devices are described in detail in the SiRFStarg® I GPS Architecture GRF1 and GSP1 data sheets. As shown in FIG. 1, the RF chip 102 communicated data samples to the baseband chip 104 using differential sign signal lines (labeled SIGN), differential magnitude signal lines (labeled MAGNITUDE), a GPS clock signal line (labeled GPSCLK), and an acquisition clock signal line (labeled ACQCLK). The baseband chip 104 could communicate with the RF chip 102 in a limited single purpose fashion, namely, by using automatic gain control (AGC) clock, data, and strobe signal lines (labeled AGCCLK, AGC-DATA, and AGCSTRB respectively) to provide AGC data to the RF chip 102'.

More recent SPS signal processing chipset solutions include the SiRFStar® IIe (centered around the GRF2i RF chip and GSP2e baseband chip) and SiRFStar® IIt (centered around the GRF2i RF chip and GSP2t baseband chip) solutions. Both retained the multiple signal lines used to communicate data samples from the RF section to the baseband section and the unidirectional communication of AGC information from the baseband section to the RF section. However, the baseband section communicated AGC information unidirectionally to the RF chip using a single pulse width modulated output that the RF chip sampled. In other words, the SiRFStar® IIe eliminated the multiple signal line AGC communication path in favor of a single output line.

Despite the capabilities of previous SPS chipset solutions, most only function with one or two very specific input frequency references, and also require several chipset pins (e.g., separate sign and magnitude data pins) to communicate data signals between the RF section and the baseband section. As the number of interface signals grows, so does the pin count and manufacturing cost of the chipset. Furthermore, only single purpose unidirectional communication capability has existed between the baseband and RF sections. As a result, the pre-existing chipset are limited in their flexibility and sophistication for incorporation into the widest possible range of devices.

Therefore, a need exists for an RF to baseband interface that overcomes the problems noted above and others previously experienced.

SUMMARY

The invention provides an interface (and methods of operating or providing interfaces) between an RF processing section and a baseband processing section. The interface supports general purpose bidirectional message transmission between the RF processing section and the baseband processing section. The interface further supports transmission of SPS signal samples between the two processing sections without adding undue complexity to the interface.

In one embodiment, the interface includes a message serial interface and a data serial interface. The message serial interface communicates messages between the RF section and the baseband section. The data serial interface communicates SPS signal sample data from the RF section to the baseband section.

The complexity of the data serial interface may be reduced, for example, by using a single data bit signal line to serially carry signal samples from the RF section to the baseband section. The data serial interface may also include a data clock signal line that provides timing for the signal samples. In particular, as an example, the data clock signal line may carry a data clock (that includes rising edges and falling edges) nominally running at 16 fo, where fo=1.023 MHz, while the data bit signal line may carry a data signal comprising serially transmitted data bits. In one embodiment, a first type of data bit is valid on the rising edge of the data clock and a second type of data bit is valid on the falling edge of the data clock. As an example, the first type of data bit may be a sign bit, while the second type of data bit may be a magnitude bit.

As noted above, a message serial interface communicates messages between the processing sections. The message serial interface may include a message-in signal line, a message-out signal line, and a message clock signal line. In some embodiments, the message serial interface may also include a slave-select signal line.

Other apparatus, systems, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate like parts throughout the different views.

DETAILED DESCRIPTION

A typical satellite positioning system ("SPS") system has approximately 12 satellites that may be visible at any one time to a wireless device. As used in this document, SPS means any system utilizing satellites and/or land-based communications devices for providing or enabling the determination of a location of the wireless device on the earth, including, but not limited to: a global positioning system ("GPS") (such as NAVSTAR), GLONASS, LORAN, Shoran, Decca, or TACAN. For the purposes of discussion, specific examples of an interface between a GPS RF processing section and a baseband processing section are described. However, the principles underlying the interface are applicable to interfacing RF processing and baseband processing sections in general.

Figure 1:
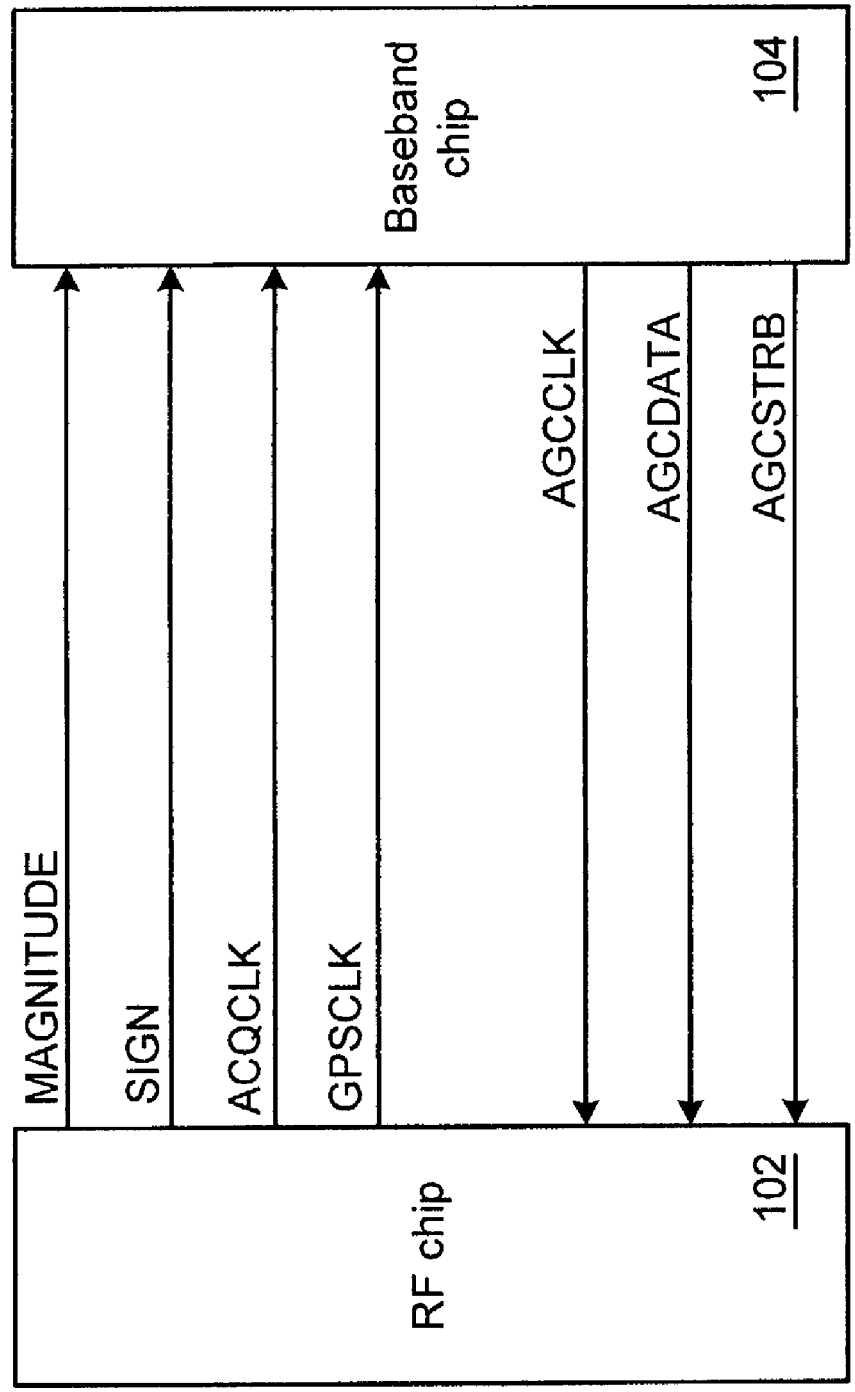
FIG. 1 shows a prior interface between a GPS RF chip and a baseband chip.
Figure 2:
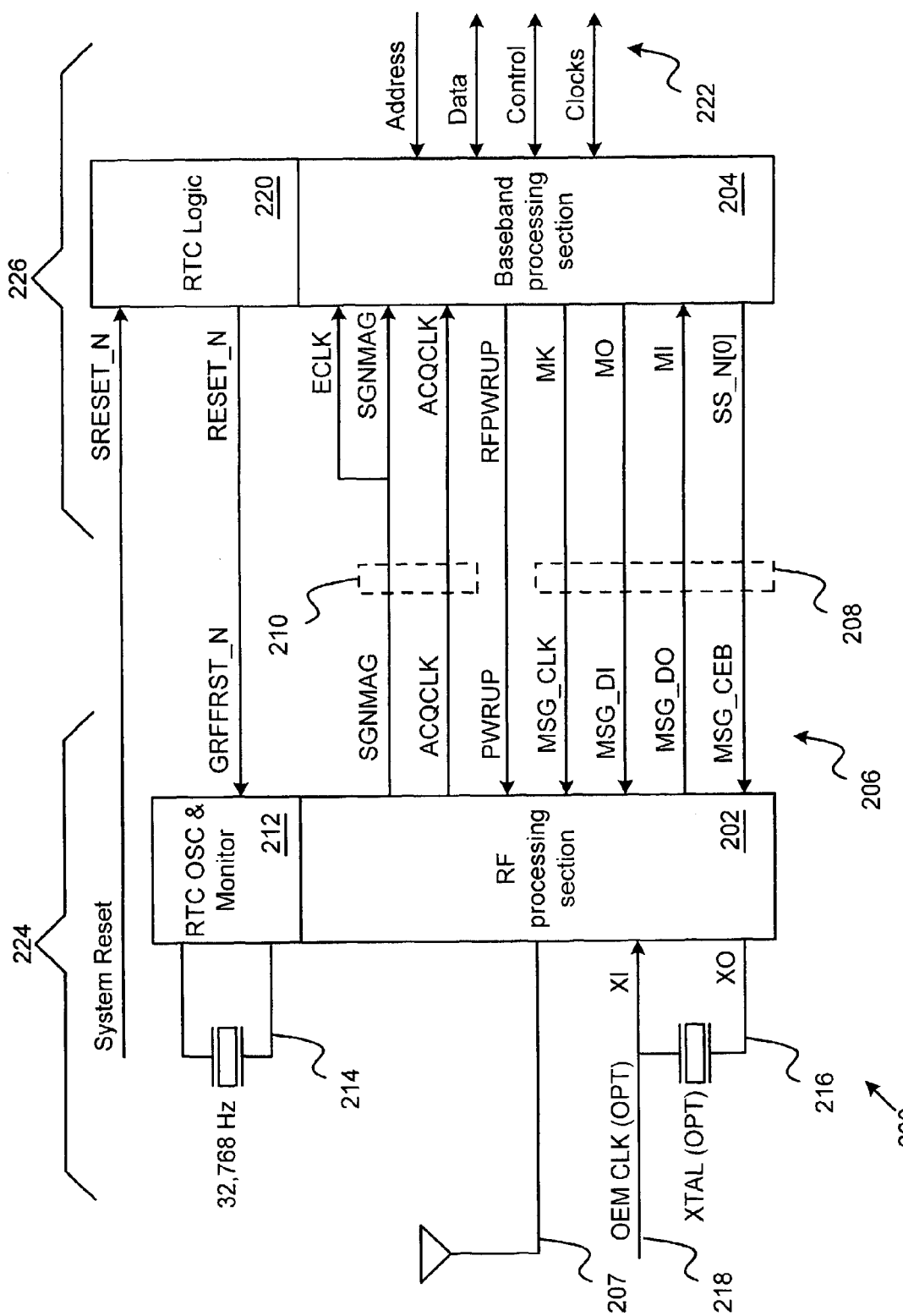
FIG. 2 illustrates a satellite positioning system receiver that includes an RF processing section coupled to a baseband processing section by an interface that includes a message serial interface and a data serial interface.

Turning first to FIG. 2, that figure shows a receiver 200 of a satellite positioning system. The receiver 200 includes an RF processing section 202 coupled to a baseband processing section 204 using an RF-to-baseband interface 206. The RF processing section 202 receives SPS signals, for example the 1575.42 MHz GPS signal, on the RF input 207.

The receiver section 200 may be generally regarded as including an RF front end 224 and a baseband back end 226. The RF front end 224 includes the RF processing section 202 and RF-to-baseband interface 206. The RF front end 224 processes the SPS signals received on the RF input 207 through a sequence of downconversion, automatic gain control, and analog to digital conversion. The baseband back end 226 includes the baseband processing section 204 and RF-to-baseband interface 206. The baseband back end 226 processes (using a microcontroller core, CPU, or other control logic) the sampled data provided by the RF front end 224. The baseband back end 226 communicates the processed data to a digital device (e.g., a digital signal processor, general purpose microcontroller or CPU, or host PC) using one or more address, data, control, and clock signals that comprise the digital communication interface 222.

Either or both of the RF front end 224 and baseband back end 226 may be implemented as individual single integrated circuits, for example. Thus, the RF front end 224 may be a single package that includes the RF input 207 (e.g., a particular input pin on the package), RF processing section 202, and interface 206 (e.g., a set of interface pins as described in more detail below). Similarly, the baseband back end 226 may be a single package that includes the baseband processing section 204, interface 206, and digital interface 222. The processing performed by the RF processing section 202 and baseband proceqsing section 204 may be that set forth in more detail in the SiRFStar® I, II, or III chipset data sheets, while the interface 206 is described in more detail below. The SiRF-Star® chipsets are available from SiRF Technology, Inc, of San Jose, Calif.

Although, as shown in FIG. 2, the functional division between the RF front end 224 and the baseband back end 226 lends itself to being divided into two separate integrated circuits, many other implementations are possible. As one example, numerous discrete logic and signal processing circuit blocks may implement the RF, baseband, and interface 206 functionality. As additional examples, any of the circuitry underlying the functionality of the RF front end 224 and the baseband back end 226 may be incorporated into a single package (e.g., that encloses multiple integrated circuit dies) or integrated circuit, multiple packages or integrated circuits, or distributed across one or more circuit boards. In these implementations, individual wires, circuit board traces, or VLSI metal or polysilicon layers carry the interface 206 signals between the RF processing circuitry and the baseband processing circuitry.

Furthermore, any of the circuitry underlying the functionality of the RF front end 224 and the baseband back end 226 may be incorporated, with additional functionality, into a single package or integrated circuit, multiple packages or integrated circuits, or distributed across one or more circuit boards. As examples, the RF and baseband circuitry may be integrated on a die with digital or analog processing circuitry for cellular telephony, PDA operation, or engine, instrument, or electronics controllers for automobiles. Thus, FIG. 2, and the examples given above are not limiting; rather, one of ordinary skill in the art will appreciate that the particular implementation, division of functionality, and packaging of the circuitry that implements the RF processing, baseband processing, and interface 206 may vary widely depending on the application at hand, engineering considerations, cost considerations, and the like.

The interface 206 includes a message serial interface 208 and a data serial interface 210. The message serial interface 208 provides for serial communication of general purpose messages bi-directionally between the RF section 202 and the baseband section 204. In contrast, the RF section 202 uses the data serial interface 210 to transmit SPS signal samples to the baseband section 204.

As an initial matter, it is noted that in general, the interface 206 signals shown in FIG. 2 are CMOS compatible. In particular, the inputs, for logic one, are above 0.7*Vcc V, and, for logic zero, are below 0.3*Vcc V. Outputs, for logic one, are above Vcc-0.4 V, and, for logic zero, are below 0.4 V. The input/output pins generally operate in either the 2.5 V or 3.3 V voltage ranges, depending on the desired implementation. The real time clock (RTC) input/output pins may operate at 1.5 V, although they may be designed to tolerate 3.3 V levels if desired. Any of the signals, however, may be adapted to different voltage ratings or specifications depending on the desired implementation.

The message serial interface 208, as shown in FIG. 2, includes the message-in signal line (labeled MSG_DO/MI), a message-out signal line (labeled MSG_DI/MO), a message clock signal line (MSG_CLK/MK) and a slave-select signal line (labeled MSG_CEB/SS_N[0]). The labels on the message signal lines indicate the direction of data flow from the perspective of the RF section 202/baseband section 204. For example, the message-out signal line (MSG_DL/MO) carries message bits input to the RF section 202 and output by the baseband section 204.

The data serial interface 210 includes the data clock signal line (labeled ACQCLK) and the data bit signal line (labeled SGNMAG). The data serial interface 210 generally uses only a single data bit signal line to communicate, serially, data bits to the baseband section 204 (as discussed below in greater detail with regard to FIG. 3). Thus, the data serial interface 210 generally includes as few as two signal lines: one for a data clock and one for data bits. The data serial interface 210 is thus a low complexity solution for a SPS signal sample interface between the RF section 202 and the baseband section 204.

As shown in FIG. 2, the receiver section 200, on the RF processing side, also includes a real time clock (RTC) oscillator (OSC) and monitor section 212. A 32 KHz crystal (or other clock source) provides an input clock 214 for the RTC OSC section 212. The RTC OSC section 212 generates a clock output on the RTCLK/RIN signal line that the baseband section 204 uses to keep, as examples, GPS time or UTC time. The clock output is, for example, a 32,768 Hz 1.5 V CMOS output. The RTC OSC section 212 continues to run during power down modes to help the baseband section 204 maintain an accurate timebase.

However, monitoring circuitry (e.g., a rectifier coupled to the clock input and followed by a comparator) in the RTC OSC section 212 determines when the input clock 214 has consistently run (e.g., has stopped for no more than 10-30 clock cycles). If the clock has stopped for too long, then the RF section 202 sets a bit (e.g., sets a flip/flop output or sets a bit in a multi-bit status register) to indicate that the clock output has not been consistent (and, in some cases, that the baseband section 204 should search over the full range of the received SPS signal to determine the correct time).

The RF section 202 also accepts clocking input from either a crystal oscillator 216 or an external clock source 218 (e.g., a frequency reference provided in a wireless device). The clocking inputs 216 and 218 provide a clock source that a PLL divider chain in the RF section 202 uses to generate the ACQCLK signal. The clocking inputs 216 and 218 are collectively referred to below as the OSCCLK, while the PLL divider chain clock is referred to as the PLLCLK. The PLLCLK is typically set to generate a nominal frequency of 16 fo (where fo=1.023 MHz) on the data clock ACQCLK derived from the OSCCLK (or an internal reference).

At power-up, the OSCCLK (generally in the range of 5-27 MHz) is present on the ACQCLK output. A message (described below) commands the RF section 202 to switch ACQCLK from OSCCLK to the PLLCLK and from the PLLCLK to the OSCCLK. The ACQCLK signal may be a 2.5/3.3 V CMOS output with a duty cycle between 45% and 55% (except when switching clock sources, in which case ACQCLK may have an extended low cycle).

A power control signal (labeled PWRUP/RFPWRUP) controls whether certain portions of the RF section 202 are powered-up. The power control signal may be connected, for example, to a voltage regulator enable pin in the RF section 202. The RTC OSC section 212 is separately powered so that it can continue to provide a clock to the baseband section 204. The power control signal may be a 2.5/3.3 V CMOS signal. The baseband processing side includes an RTC logic section 220. The RTC logic section 220 accepts the input clock generated by the RTC OSC and monitor section 212 as an aide in determining the current time as well as SPS location solutions.

The RTC logic section 220 also outputs the reset signal GRFRST_N/RESET_N (asserted low). The reset signal may be used to reset the state of control registers in the RTC OSC section 212 and the RF section 202 at power-on. For example, when GRFRST_N is asserted, the digital control registers on the RF processing side will be reset to their default states. The default states of the control registers allow the OSCCLK circuits to operate and allow the ACQCLK output to be driven by OCSCLK (when PWRUP) is asserted. When GRFRST_N is not asserted, then the RF section 202 operates according to its internal logic states.

The message serial interface signals are 2.5/3.3V CMOS I/O signals. The MSG_CLK/MK, MSG_DI/MO, and MSG_CEB/SS_N[0] signals are inputs to the RF section 202. The MSG_DO/MI signal is an output from the RF section 202 with tri-state control. When the MSG_CEB/SS_N[0] is logic high, the MSG_DO/MI output is high impedance and may be driven by other devices that are also connected to the message serial interface 208. Thus, the MSG_CEB/SS_N[0] output from the baseband section 204 operates as a slave selection signal that allows the RF section 202 to drive data on the MSG_DO/MI signal line. When additional devices are attached to the message serial interface 208, the baseband section 204 may provide additional slave selection signal lines to determine which device is allowed to drive data on the MSG_DO/MI signal line.

The RF section 202 may also include one or more inputs for external analog sensors (not shown). Thus, a multi-channel analog to digital (A/D) converter in the RF section 202 may take measurements of analog input signals and communicate the results to the baseband section 204. The analog inputs may include, but not be limited to, temperature inputs, gyro turn rate inputs, wheel tick inputs, or a battery voltage inputs.

Table 1 summarizes the operating modes for the receiver section 200:

TABLE 1

| Mode | GRFRST_N | PWRUP | Operation |
|---|---|---|---|
| Sleep | 0 | 0 | RF section voltage regulator disabled; RTC OSC section isolated from RF section. |
| Start-up | 0 | 1 | RF section voltage regulator enabled; RTC OSC section isolated; registers reset; OSCCLK enabled; ACQCLK outputs OSCCLK. |
| NA | 1 | 0 | Not allowed. |
| Normal | 1 | 1 | RF section voltage regulator enabled; RTC OSC section communicates with RF section; messages control RF section operation. |

Figure 3:
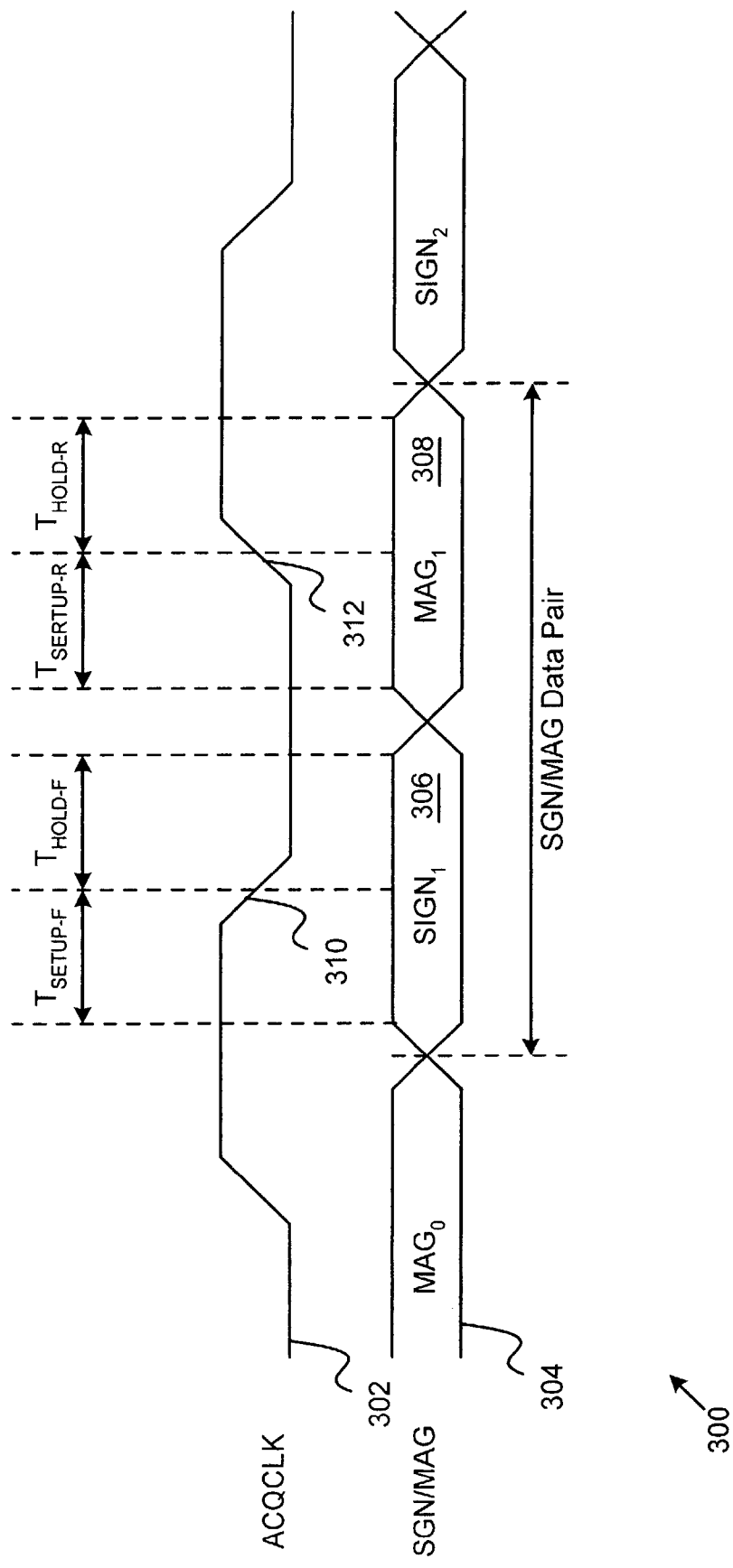
FIG. 3 illustrates a timing diagram that shows the relationship between a data clock and a data signal carried, respectively, on a data clock signal line and a data bit signal line that form the data serial interface shown in FIG. 2.

Turning next to FIG. 3, that figure illustrates a timing diagram 300 that shows the relationship between a data clock 302 and a data signal 304. The data signal 304 provides SPS signal samples to the baseband section 204. The SPS signal samples are derived from an SPS input signal received by an antenna connected to the RF section 202. The ACQCLK signal line carries the data clock 302, while the SGNMAG signal line carries the data signal 304. The data signal 304, which may be, for example, a 2.5/3.3 V CMOS output, transmits both sign bit data 306 and magnitude bit data 308 on the SGNMAG signal line. In one embodiment, the data signal 304 provides sign and magnitude bit information determined by an A/D converter in the RF section 202.

In other embodiments, additional bits of information or quantization may be provided, in concert with a predetermined protocol or encoding technique applied to the data bits (e.g., a pseudorandom noise code) to allow the baseband section 204 to identify the data transmitted. Furthermore, the data signal 304 may transmit signal samples for different radio chains handled by the RF section 202. For example, when the RF section 202 is processing SPS data, the data signal 304 may bear the two bits per sample (sign and magnitude) data pairs noted above. In contrast, when the RF section 202 is processing a different RF signal (e.g., a Bluetooth signal), the data signal 304 may instead transmit more or less bits per sample (e.g., 4 or 6 bits) in accordance with the guidelines established for processing that RF signal. Similarly, the data clock 302 may vary in frequency and duty cycle to meet the processing guideline for the RF signal that the RF section 202 is currently processing.

As shown in FIG. 3, the RF section 202 outputs the sign bit 306 when the data clock 302 is high and outputs the magnitude bit 308 when the data clock 302 is low. As shown in FIG. 3, the sign bit 306 is valid no less than $T_{SETUP-F}$ before the falling edge 310 of the data clock 302. Similarly, the magnitude bit 308 is valid no less than $T_{SETUP-R}$ before the rising edge 312 of the data clock 302.

The sign bit 306 remains valid no less than $T_{HOLD-F}$ after the falling edge 310 of the data clock 302. The magnitude bit 308 remains valid no less than $T_{HOLD-R}$ after the rising edge 312 of the data clock 302. The setup and hold times may vary from implementation to implementation. As one example, the setup and hold times may be approximately 5-10 ns.

The message serial interface 208 may be implemented in a wide variety of ways. In one embodiment, the message serial interface 208 has the characteristics set forth below, although other implementations are also possible.

The message serial interface on the RF section 202 operates as a slave device to the baseband section 204 (or other master device that adheres to the characteristics set forth below). The input bits to the RF section 202 (on the MSG_DI line) are shifted into a 32 bit shift register in the RF section 202 under control of the MSG_CLK. Data is received and transmitted with the most significant bit first. In one implementation, up to 32 bits are sent in one message block. Simultaneously, the MSG_DO output bits are shifted out of the other end of the same shift register. If output from the RF section 202 is not needed, then the MSG_DO output need not be connected.

The MSG_CLK may, for example, operate at up to 20 MHz, while the message serial interface inputs are above 0.7*VCC V for logic 1 and below 0.3*VCC V for logic 0, and the outputs are above VCC-0.4 V for logic 1 and below 0.4 V for logic 0.

The slave select signal line (MSG_CEB) is active low for serial data transmission. The MSG_DI and MSG_CLK may therefore be ignored as long as MSG_CEB has been high for a pre-selected period of time (e.g., 5 ns). Data is sampled on the rising edge of MSG_CLK. In one implementation, a transition on MSG_DI or MSG_DO occurs at least 5 ns after the rising edge of MSG_CLK and stabilizes at least 5 ns before the next rising edge of MSG_CLK. The data is shifted on the falling edge of MSG_CLK. Continuing the example, the MSG_CEB signal may be active (logic 0) at least 10 ns before the rising edge of the first MSG_CLK and may remain active (logic 0) at least 10 ns after the last falling edge of MSG_CLK. The time interval in both cases may be, for example, one half of one clock cycle. The MSG_CEB signal may then be inactive (logic 1) for at least 30 ns to ensure the data is latched.

If the MSG_CEB signal transitions high before all data in a message block have been sent, the data is discarded and not applied to RF section 202 registers. Unused bits in a message block are set to zero. However, a fast write mode is provided to allow for a shortened, one byte message. The fast write mode is assumed until more than 8 bits have been received. When more than 8 bits have been received, the RF section 202 expects to receive a full 32 bits for a valid message.

The RF section 202 outputs data (on MSG_DO) to the baseband section 204 in response to a message received from the baseband section 204 that requests the data. The baseband section 204 then sends a subsequent message to shift out the requested data in the RF section 202 shift register from the shift register. The subsequent message may be an independent operational message or it may be a dummy message sent for the sole purpose of shifting out the desired data.

Figure 4:
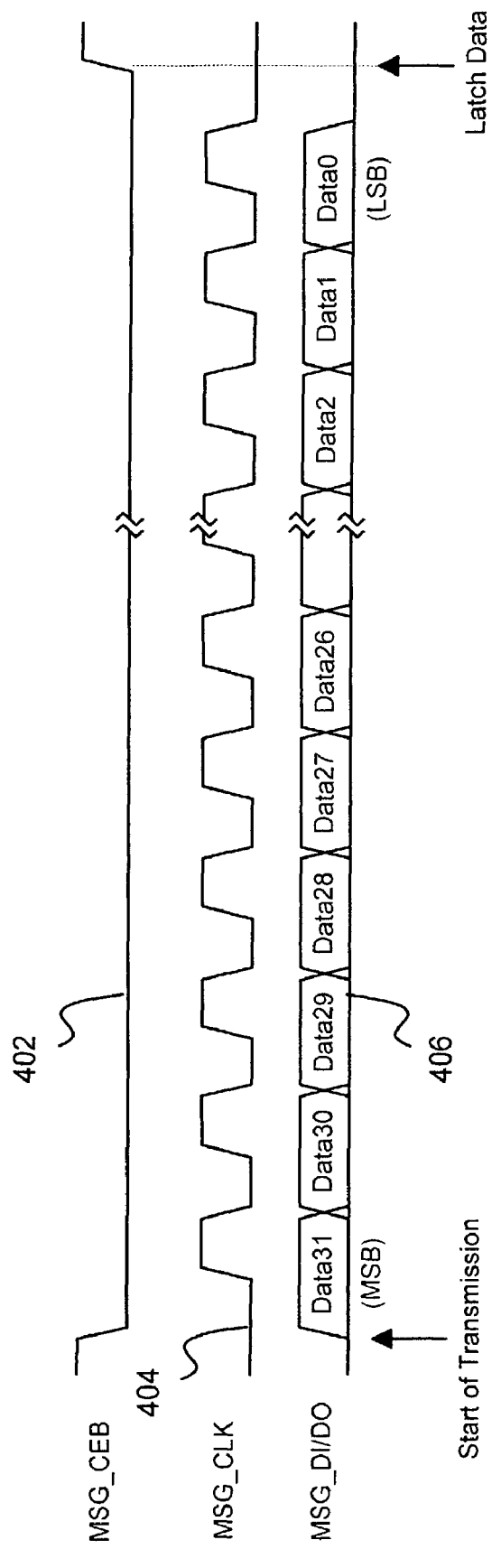
FIG. 4 illustrates a timing diagram that shows the relationship between a message clock and message data bits carried, respectively, on a message clock signal line and message data bit signal line that form part of the message serial interface shown in FIG. 2.

FIG. 4 illustrates a timing diagram 400 that shows the relationship between the slave select signal (MSG_CEB) 402, the message clock signal (MSG_CLK) 404, and the message data bit signals (MSG_DO and MSG_DI) 406. Data transmission starts when the slave select signal 402 falls. The transmitted data are latched when the slave select signal 402 rises.

As shown in FIG. 4, the message-out signal line (MSG_DI/MO) and message-in signal line (MSG_DO/MI) each carry a serial bit stream. The serial bit stream on the message-out signal line represents a message selected from a group of predefined RF section messages that are transmitted from the baseband section 204 to the RF section 202. Similarly, the serial bit stream on the message-in signal line represents a message selected from a group of predefined baseband section messages that are transmitted from the RF section 202 to the baseband section 204.

The messages are not limited to any particular purpose or format. As explained in more detail below, the messages may include, but not be limited to, RF section power control messages, RF section test messages, clock status messages, analog measurement messages, channel conversion count messages, and the like.

In one implementation, there are four types of message blocks defined. Data [1:0] (in a 32-bit or 8-bit sequence) are address bits that define the four messages as shown in Table 2 below. Each message type is able to support both a fast write mode and a full write mode and spare capacity has been defined for both modes.

TABLE 2

Message Blocks

| Data [1:0] | Message Type | Message Name |
|---|---|---|
| 00 | 0 | AGC (Fast Write) and Synthesizer |
| 01 | 1 | Power Control (Fast Write) and Synthesizer |
| 10 | 2 | Output Message Types |
| 11 | 3 | Input Message Type Expansion |

The contents of each message are defined in detail in 3 through 8. Table 3 shows AGC and synthesizer control messages, Table 4 shows power control and synthesizer control messages, and Table 5 shows output request types for a selected message type. Table 6 shows output message types and Tables 7-8 show input message types, The columns define the contents as follows. The first column, labeled Bits, represents the message data bits, with bit 0 indicating the last bit transmitted. The second column, labeled Field Name, identifies the name of the field in the message. The third column, labeled Length, is the length of the field. The forth column, labeled Default, indicates the contents of the default parameter in the RF section 202 when power is first applied. The fifth column, labeled Contents, describes the allowed contents of the field. The sixth column, labeled Function, indicates what the field accomplishes. And, the seventh column, labeled_Pwr, indicates which power domain control bit, if any, is used to drive these field outputs to zero on the interface to the RF section 202.

Message type 2 provides for implementing output requests using a field that specifies up to 32 types of output requests. Message type 3 provides for expanding the input message types (or addresses) from 4 to 36. References below to the "synthesizer" are references to the PLL synthesizer clock generation circuitry in the RF section 202. The PLL synthesizer is configurable, for example, by setting clock divider values to generate the PLLCLK from a number of different input reference frequencies.

TABLE 3

Message Type 0: AGC and Synthesizer Control
(Address [1:0] = 0)

| Bits | Field Name | Length | Default | Contents | Function | _Pwr |
|---|---|---|---|---|---|---|
| 31:28 | Spare0 [3:0] | 4 | 0 | 0 | Spare | |
| 27:8 | NUM [19:0] | 20 | TBD | 0x00000-0xFFFFF | Specifies the numerator of the fractional part of the loop divider in the PLL clock generation section of the RF section 202. | Synth |
| 7:2 | AGC [5:0] | 6 | 0 | 0x00-0x3F | Controls AGC gain in the RF section 202 | Rx |
| 1:0 | Address [1:0] | 2 | 0 | 0 | Defines message type | |

TABLE 4

Message Type 1: Power Control and Synthesizer Control
(Address [1:0] = 1)

| Bits | Field Name | Length | Default | Contents | Function | _Pwr |
|---|---|---|---|---|---|---|
| 31:28 | Spare1 [3:0] | 4 | 0 | 0 | Spare | |
| 27 | InvertFePwr | 1 | 0 | 0: Fe_Pwr = Rx_Pwr  1: Fe_Pwr = ~Rx_Pwr | Partition the reception chain in the RF section 202 for testing purposes | |
| 26 | WideBwFilter | 1 | 1 | 0 = Narrow BW  1 = Wide BW | Select the filter used in the RF section 202. | Rx |
| 25:18 | ND [7:0] | 8 | — | 0x00-0xFF | Specifies the integer part of a synthesizer loop divider parameter in the PLL clock generation section | Synth |
| 17:15 | RDIV [2:0] | 3 | — | 0x0-0x7 | Specifies a synthesizer reference divider value in the PLL clock generation section | Synth |
| 14:11 | CP [3:0] | 4 | — | — | Specifies the synthesizer charge pump output and test modes | PLL |
| 10 | PD_POL | 1 | — | 1 = positive, 0 = negative | Specifies the phase detector polarity | PLL |
| 9 | DvSel | 1 | 1 | 0 = Fractional  1 = Integer | Specifies the divider for PLL feedback | PLL |
| 8 | SDO | 1 | 1 | 0 = Third Order SD  1 = First Order SD | Chooses Sigma Delta Order | Synth |
| 7 | Rx_Pwr | 1 | 0 | 1 = on, 0 = off | Controls front end power for $2^{nd}$ low noise amplifier through A/D converter | |
| 6 | AcqClk_Sel | 1 | 0 | 1 = PLL, 0 = Osc | Controls glitch-free switch that selects OSCCLK or PLLCLK for ACQCLK | |
| 5 | Synth_Pwr | 1 | 0 | 1 = on, 0 = off | Controls power to fractional N synthesizer | |
| 4 | PLL_Pwr | 1 | 0 | 1 = on, 0 = off | Controls power for PLL and divider chain | |
| 3 | LNA1_Pwr | 1 | 0 | 1 = on, 0 = off | Controls power for first (optional) LNA | |
| 2 | Osc_Pwr | 1 | 1 | 1 = on, 0 = off | Controls power for oscillator, ACQCLK-select mux and ACQCLK driver | |
| 1:0 | Address [1:0] | 2 | 1 | 1 | Defines message type | |

TABLE 5

Message Type 2: Output Request Types 0 to 31
(Address [1:0] = 2)

| Bits | Field Name | Length | Default | Contents | Function |
|---|---|---|---|---|---|
| 31:8 | Spare2 [28:5] | 24 | 0 | 0 | Spare |
| 7:3 | Spare2 [4:0] or Out_Dat [4:0] | 5 | 0 | 0-31 | Spare (Fast Write), if Out_Req = 0  Output data type, if Out_Req = 1 |
| 2 | Out_Req | 1 | 0 | 0 = data  1 = output | When = 0, data follows  When = 1, output data to load follows |
| 1:0 | Address [1:0] | 2 | 2 | 2 | Defines message type. |

Output message types are shown in Table 6. Spare messages have been defined for expansion or use in testing the RF section 202. Since this data is input to the message interface from the RF section 202, these fields are given names denoting input, such as spareInA. When the data is shifted out, it is positioned in the output data stream using the index values given. For example, spareInA [23:0] would be located in the final 24 bits shifted out in the 32 bit output field, so that eight leading zeros would be followed by spareInA [23] through spareInA [0] according to the convention of shifting out the most significant bit first.

Out_Dat [4:0]==4-8 specify 20-bit measurements taken by a dual slope A/D converter in RF section 202. As noted above, the A/D converter may have multiple channels connected to one or more analog measurement devices. As used below, Out_Dat [4:0]=9 specifies the valid clock bit maintained by the RTC OSC section 212 and described above.

TABLE 6

Output Messages Defined Using Message Type 2 (Address [1:0] = 2 and Out_Req = 1)

| Out_Dat [4:0] | Message Bits | Contents |
|---|---|---|
| 0 | 31:24 | 0 |
|   | 23:0 | SpareInA [23:0] |
| 1 | 31:24 | 0 |
|   | 23:0 | SpareInB [23:0] |
| 2 | 31:24 | 0 |
|   | 23:0 | SpareInC [23:0] |
| 3 | 31:24 | 0 |
|   | 23:0 | SpareInD [23:0] |
| 4 |  | DS_ADC_CH_0 |
|   | 31:30 | LAST_CH [1:0] |
|   | 29:20 | Spare [9:0] |
|   | 19:0 | DATA0 [19:0] |
| 5 |  | DS_ADC_CH_1 |
|   | 31:30 | LAST_CH [1:0] |
|   | 29:20 | Spare [9:0] |
|   | 19:0 | DATA1 [19:0] |
| 6 |  | DS_ADC_CH_2 |
|   | 31:30 | LAST_CH [1:0] |
|   | 29:20 | Spare [9:0] |
|   | 19:0 | DATA2 [19:0] |
| 7 |  | DS_ADC_CH_3 |
|   | 31:30 | LAST_CH [1:0] |
|   | 29:20 | Spare [9:0] |
|   | 19:0 | DATA3 [19:0] |
| 8 |  | DS_ADC_CNT |
|   | 31:30 | LAST_CH [1:0] |
|   | 29:20 | Spare [9:0] |
|   | 19:0 | COUNT [19:0] |
| 9 |  | RTC_STA |
|   | 31:1 | Spare [30:0] |
|   | 0 | 0 = RTC Not Valid (default) |
|   |   | 1 = RTC Valid |
| 29 | 31:26 | 0 |
|   | 25:0 | Power Control Message Register [24:0] |
| 30 | 31:0 | Message Input Shift Register |
| 31 | 31:16 | 0 |
|   | 15:0 | Chip Version [15:0] |

TABLE 7

Message Type 3: Expanded Input Message Types (Address [1:0] = 3)

| Bits | Field Name | Length | Default | Contents | Function |
|---|---|---|---|---|---|
| 31:8 | Spare3 [28:5] | 24 | 0 | 0 | Spare |
| 7:3 | Spare3 [4:0] or Address [6:2] | 5 | 0 | 0-31 | Spare (Fast Write), if Addr_Exp = 0 Address expansion, if Addr_Exp = 1 |
| 2 | Addr_Exp | 1 | 0 | 0 = data 1 = address | When = 0, data follows When = 1, address follows |
| 1:0 | Address [1:0] | 2 | 3 | 3 | Defines message type. |

Sparc messages (useful for test or expansion purposes) are shown in Table 8. Because these data represent control bits output by the message interface to the RF section 202, the data fields have been named to denote outputs, for example, SpareOutA.

A test message has also been defined for the SGNMAG output signal line. When TestSignMag [8]=one, the test mode is entered. When the bit is a zero, test mode is turned off. In test mode, the pattern specified in TestSignMag [7:0] is output, as tong as ACQCLK is running, beginning with TestSignMag [7] while ACQCLK is high.

TABLE 8

Input Messages using Message Type 3 (Address [1:0] = 3 and Addr_Exp = 1)

| Address [6:2] | Msg Bits | GRFRST_N | Contents |
|---|---|---|---|
| 0 | 31:8 | 0 | SpareOutA [23:0] |
| 1 | 31:8 | 0 | SpareOutB [23:0] |
| 2 | 31:8 | 0 | SpareOutC [23:0] |
| 3 | 31:8 | 0 | SpareOutD [23:0] |
| 4 | 16:8 | 0 | TestSignMag [8:0] |
| 5 |  |  | DS_ADC_PER |
|   | 31:12 | 0 | PERIOD [19:0] |
|   | 11 | 0 | CLK_SEL |
|   | 10 | 0 | CLK_ENB |
|   | 9:8 | 0 | Spare [1:0] |
| 6 |  |  | DS_ADC_SH |
|   | 31:12 | 0 | SHIFT [19:0] |
|   | 11:8 | 0 | Spare [3:0] |
| 7 |  |  | DS_ADC_PH |
|   | 31:12 | 0 | PH_ONE [19:0] |
|   | 11:8 | 0 | Spare [3:0] |
| 8 |  |  | DS_ADC_SEQ |
|   | 31:12 | 0 | CH_SEQ [23:0] |
|   | 11:8 | 0 | Spare [3:0] |
| 9 |  |  | RTC_CTL |
|   | 31:10 | 0 | Spare [21:0] |
|   | 9 | 0 | 1: Set RTC Status |
|   |   |   | 0: No action (default) |
|   | 8 | 0 | 1: Read RTC Status |
|   |   |   | 0: No action (default) |
| 10 |  |  | SGNMAG_SIG |
|   | 31:1 | 0 | Spare [30:0] |
|   | 0 | 0 | 0: SGNMAG (default) |
|   |   |   | 1: OSCCLK |

Address [6:2]=5-8 specify parameters for the dual slope A/D converter in the RF section 202. The DS_ADC_PER message sets the 20-bit conversion period, the duration of an entire A/D conversion cycle (PERIOD), selects one of the input clocks (e.g., OSCCLK or PLLCLK) provided to the A/D converter (CLK_SEL), and enables or disables the clock (CLK_ENS). The DS_ADC_SH message provides a 20-bit shift period (SHIFT) that the A/D converter control circuitry uses as a count down value before initiating conversion in order to change the phase of the A/D conversion cycles relative to any given time base. The DS_ADC_PH specifies a 20-bit phase one conversion period (e.g., the duration of the integration period) for the dual slope A/D converter.

The DS_ADC_SEQ message specifies 24 bits that control the order in which the A/D converter performs a conversion on each of four input channels. More specifically, the 24 bits are partitioned into 12 pairs of bits; each pair specifies the next input channel to the analog multiplexer before the A/D converter. The pairs of bits thus control which channel is next digitized by the A/D converter and the four input channels may thereby be sampled at different rates.

Continuing with regard to Table 8, Address [6:21]=9 specifies that the clock status bit in the RTC OSC section 212 will be set to indicate a good clock, or (if bit 8 is a one) that the baseband section 204 is requesting the value of the clock status bit to be output by the RF section 202. Address [6:2]=10 controls (e.g., via a multiplexer) the signal that the RF section 202 provides on the SGNMAG signal line. The default is the sign bit and magnitude bit information, while the alternative is the OSCCLK signal.

Figure 5:
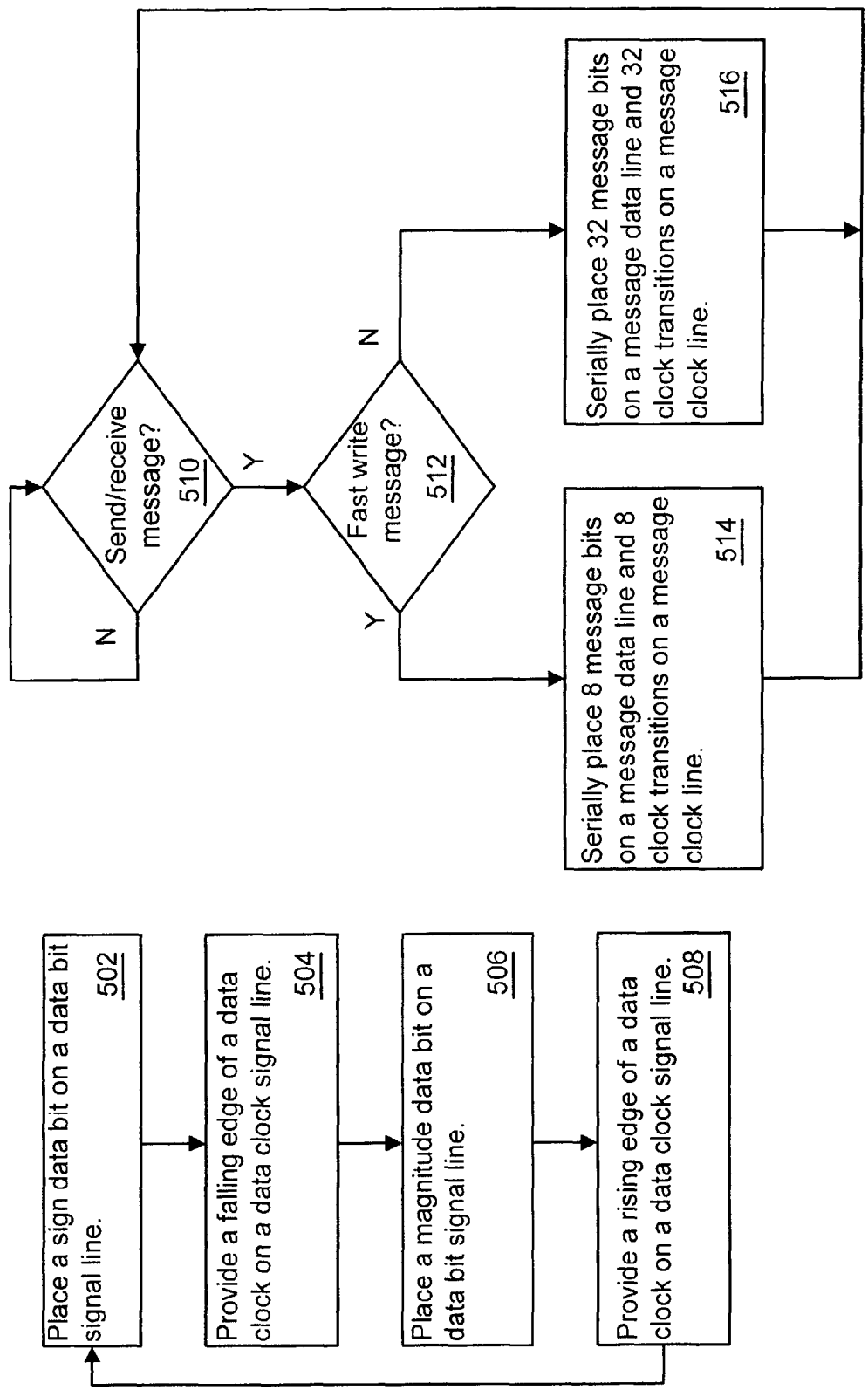
FIG. 5 shows a method for interfacing an RF processing section and a baseband processing section.

Turning next to FIG. 5, that Figure shows a flow diagram 500 that shows a method for interfacing the RF section 202 and the baseband section 204. In particular, with regard to the serial transmission of SPS signal samples to the baseband section 204, the RF section 202 places a sign bit 306 on the SGNMAG signal line (step 502), then provides a falling edge 310 on the ACQCLK line (step 504). Subsequently, the RF section 202 places a magnitude bit 308 on the SGNMAG signal line (step 506), then provides a rising edge 312 on the ACQCLK line (step 508). This sequence repeats for each sign bit and magnitude bit sample pair transmitted to the baseband section 204. SPS signal data is thereby serially transferred to the baseband section 204.

With regard to message transmission between the RF section 202 and the baseband section 204, the master device (typically the baseband section 204) determines whether it needs to send or receive data over the message serial interface 208 (step 510). If so, the baseband section 204 determines if the message is a fast write message (step 512). If the message is a fast write message, then the baseband section 204 (if it is transmitting data) or the RF section 202 (if it is transmitting data) serially places 8 data bits on the appropriate serial message data line. Each data bit is shifted in by a message clock 404 transition for each data bit. (step 514). Otherwise, the baseband section 204 or the RF section 202 serially places 32 data bits on the appropriate serial message line, with each data bit shift in by a message clock 404 transition (step 516).

The slave select signal line may be used to transfer timing between the baseband section 204 and the RF section 202. In particular, the COUNT[19:0] output (see Table 6, Out_Dat=8) represents the value of a counter present in the RF section 202 that reveals the sampling phase of the dual slope A/D converter in the RF section 202. The slave select signal line is connected to circuitry in the RF section 202 that latches DSP timing. Thus, the COUNT value is the value in the counter at the time the slave select signal causes the message that requests the COUNT output to latch the COUNT value into the shift register for transmission. In the baseband section 204, the slave select signal latches a counter (or another representation of time) when the slave selected signal is de-asserted (which is also when the RF section 202 latches COUNT).

The A/D sample timing may thereby be related to the baseband section 204 timing. The SHIFT[19:0] input (see Table 8, Address=6) is used to shift the A/D timing to a desired offset from the baseband section 204 timing. As a result, the baseband section 204 may change the timing of the RF section 202 circuitry without additional interface lines.

Thus, systems and methods consistent with the invention provide interfaces (and methods of operating or providing interfaces) between an RF processing section 202 and a baseband processing section 204. The interface supports general purpose message transmission as well as transmission of SPS signal samples between the two processing sections without adding undue complexity to the interface.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

What is claimed is:

1. A radio frequency (RF) to baseband interface coupling an RF section for processing RF signals to a baseband section for processing baseband signals, the interface comprising:
   a bi-directional message serial interface for communicating multi-purpose messages between the RF section and the baseband section; and
   a data serial interface for communicating signal sample data from the RF section to the baseband section, the data serial interface comprising a data clock signal line and a single data bit signal line to carry a data clock signal and to serially carry the signal sample data, respectively, the signal sample data including sign bits and magnitude bits,
   wherein the data clock signal line carries the data clock signal comprising rising edges and falling edges, and the sign bits are valid on the falling edges of the data clock signal and the magnitude bits are valid on the rising edges of the data clock signal, each rising and falling edge including a pairing of the sign and magnitude bits.

2. The interface of claim 1, wherein the message serial interface comprises a message-in signal line, a message-out signal line and a message clock signal line.

3. The interface of claim 2, wherein the message serial interface further comprises a slave-select signal line.

4. A method for interfacing a radio frequency (RF) section for processing RF signals to a baseband section for processing baseband signals, the method comprising the steps of:
   serially communicating multi-purpose messages, on a message serial interface, bi-directionally between the RF section and the baseband section; and
   serially communicating signal sample data, on a single data bit signal line, from the RF section to the baseband section, using a data clock signal line to facilitate shifting the signal sample date in between the RF section and the baseband section, the signal sample data including sign bits and magnitude bits,
   wherein the data clock signal line carries the data clock signal comprising rising edges and falling edges, and the sign bits are valid on the falling edges of the data clock signal and the magnitude bits are valid on the rising edges of the data clock signal, each rising and falling edge including a pairing of the sign and magnitude bits.

5. The method of claim 4, wherein the step of serially communicating messages comprises the step of serially communicating messages using a message-in signal line, a message-out signal line and a message clock signal line.

6. A radio frequency (RF) to baseband interface coupling an RF section for processing RF signals to a baseband section for processing baseband signals, the interface comprising:
   a bi-directional message serial interface for communicating between the RF section and the baseband section, the message serial interface comprising:
     a message clock line that facilitates shifting data bits in between the RF section and the baseband section;
     a message-in signal line and a message-out signal line, each carrying the data bits between the RF section and the baseband section; and
     a slave select signal line that facilitates transferring the timing of shifting the data bits in between the RF section and the baseband section, wherein the message-out signal line carries an output bit stream representing a multipurpose message selected from a predefined RF section message group, the predefined RF section message group comprising an RF section power control message and an RF section test message, wherein the predefined message group further comprises an RF section programmable clock synthesizer message, which is used to generate different reference frequencies.

7. The interface of claim 6, wherein the programmable clock synthesizer message comprises a reference divider value.

8. The interface of claim 7, wherein the reference divider value is an integer divider value.

9. The interface of claim 7, wherein the reference divider value is a fractional divider value.

10. The interface of claim 6, wherein the predefined message group further comprises a clock output selection message for selecting a message clock for the message clock line.

11. The interface of claim 6, wherein the message-in signal line carries an input bit stream representing a message selected from a predefined baseband section message group, the predefined baseband section message group comprising a clock status message and an analog measurement message.

12. The interface of claim 11, wherein the predefined baseband section message group further comprises a channel conversion count message.

13. The interface of claim 11, wherein the analog measurement message comprises an analog measurement message for at least one of a plurality of analog input channels.

14. The interface of claim 6, further comprising a data serial interface further comprising a data clock signal line and a single data bit signal line to carry a data clock signal and to serially carry the signal sample data from the RF section to the baseband section, respectively, the signal sample data including sign bits and magnitude bits.

15. The interface of claim 14, wherein:
the data clock signal line carries the data clock signal comprising rising edges and falling edges; and
the sign bits are valid on the rising edges of the data clock signal and the magnitude bits are valid on the falling edges of the data clock signal, each rising and falling edge including a pairing of the sign and magnitude bits.

16. An RF front end for a satellite positioning system, receiver, the front end comprising:
an RF processing section comprising an RF input for receiving satellite positioning system signals; and
an RF to baseband interface coupled to the RF processing section, the interface comprising:
a bi-directional message serial interface for communicating multi-purpose messages between the RF processing section and a baseband processing section; and
a data serial interface for communicating signal sample data from the RF processing section to the baseband processing section, the data serial interface comprising a data clock signal line and a single data bit signal line to carry a data clock signal and to serially carry the signal sample data, respectively, the signal sample data including sign bits and magnitude bits,
wherein the data clock signal line carries the data clock signal comprising rising edges and falling edges, and the sign bits are valid on the falling edges of the data clock signal and the magnitude bits are valid on the rising edges of the data clock signal, each rising and falling edge including a pairing of the sign and magnitude bits.

17. The RF front end of claim 16, wherein the RF processing section and the RF to baseband interface are implemented as an individual single integrated circuit (IC).

18. The RF front end of claim 16, wherein the message serial interface comprises:
a message clock line;
a message-in signal line and a message-out signal line; and
wherein the message-out signal line carries an output bit stream representing a message selected from a predefined RF section message group.

19. The RF front end of claim 18, wherein the RF section message group comprises an RF section power control message and an RF section test message.

20. The RF front end of claim 19, wherein the predefined message group further comprises a clock output selection message for selecting a message clock for the message clock line.

21. The RF front end of claim 18, wherein the message-in signal line carries an input bit stream representing a message selected from a predefined baseband section message group, the predefined baseband section message group comprising a clock status message and an analog measurement message.

22. The RF front end of claim 21, wherein the analog measurement message comprises an analog measurement message for at least one of a plurality of analog input channels.

23. A baseband back end for a satellite positioning system receiver, the back end comprising:
a baseband processing section comprising at least one address line, at least one data line, and at least one control line for communicating with a digital device; and
an RF to baseband interface coupled to the baseband processing section, the interface comprising:
a bi-directional message serial interface for communicating multi-purpose messages between an RF processing section and the baseband processing section; and
a data serial interface for communicating signal sample data from the RF processing section to the baseband processing section, the data serial interface comprising a data clock signal line and a single data bit signal line to carry a data clock signal and to serially carry the signal sample data, respectively, the signal sample data including sign bits and magnitude bits,
wherein the data clock signal line carries the data clock signal comprising rising edges and falling edges, and the sign bits are valid on the falling edges of the data clock signal and the magnitude bits are valid on the rising edges of the data clock signal, each rising and falling edge including a pairing of the sign and magnitude bits.

24. The baseband back end of claim 23, wherein the baseband processing section and the RF to baseband interface are implemented as an individual single IC.

25. The baseband back end of claim 23, wherein the message serial interface comprises:
a message clock line;
a message-in signal line and a message-out signal line; and
wherein the message-out signal line carries an output bit stream representing a message selected from a predefined RF section message group.

26. The baseband back end of claim 25, wherein the RF section message group comprises an RF section power control message and an RF section test message.

27. The baseband back end of claim 26, wherein the predefined message group further comprises a clock output selection message for selecting a message clock for the message clock line.

28. The baseband back end of claim 25, wherein the message-in signal line carries an input bit stream representing a message selected from a predefined baseband section message group, the predefined baseband section message group comprising a clock status message and an analog measurement message.

29. The baseband back end of claim 28, wherein the analog measurement message comprises an analog measurement message for at least one of a plurality of analog input channels.

30. A satellite positioning system receiver comprising:
an RF front end comprising an RF processing section and an RF input for receiving satellite positioning system signals;
a baseband back end comprising a baseband processing section and at least one address, data, and control line for communicating with a digital device; and
an RF to baseband interface coupled between the RF processing section and the baseband processing section, the interface comprising:
a bi-directional message serial interface for communicating multi-purpose messages between the RF processing section and the baseband processing section; and
a data serial interface for communicating signal sample data from the RF processing section to the baseband processing section, the data serial interface comprising a data clock signal line and a single data bit signal line to carry a data clock signal and to serially carry the signal sample data, respectively, the signal sample data including sign bits and magnitude bits,
wherein the data clock signal line carries the data clock signal comprising rising edges and falling edges, and the sign bits are valid on the falling edges of the data clock signal and the magnitude bits are valid on the rising edges of the data clock signal, each rising and falling edge including a pairing of the sign and magnitude bits.

31. The satellite positioning system receiver of claim 30, wherein the RF processing section, the RF input, and the RF to baseband interface are implemented as an individual single IC.

32. The satellite positioning system receiver of claim 30, wherein the message serial interface comprises:
a message clock line; a message-in signal line and a message-out signal line; and
wherein the message-out signal line carries an output bit stream representing a message selected from a predefined RF section message group.

33. The satellite positioning system receiver of claim 32, wherein the message-in signal line carries an input bit stream representing a message selected from a predefined baseband section message group, the predefined baseband section message group comprising a clock status message and an analog measurement message.

34. The satellite positioning system receiver of claim 33, wherein the analog measurement message comprises an analog measurement message for at least one of a plurality of analog input channels.

35. The satellite positioning system receiver of claim 32, wherein the RF section message group comprises an RF section power control message and an RF section test message.

36. The satellite positioning system receiver of claim 35, wherein the predefined message group further comprises a clock output selection message for selecting a message clock for the message clock line.

37. The satellite positioning system receiver of claim 30, wherein the baseband processing section and the RF to baseband interface are implemented as an individual single IC.

\* \* \* \* \*